United States Patent
Chila et al.

(10) Patent No.: US 9,671,112 B2
(45) Date of Patent: Jun. 6, 2017

(54) AIR DIFFUSER FOR A HEAD END OF A COMBUSTOR

(71) Applicant: General Electric Company, Schenectady, NY (US)

(72) Inventors: Ronald James Chila, Greenfield Center, NY (US); Gregory Allen Boardman, Greer, SC (US); James Harold Westmoreland, Greer, SC (US)

(73) Assignee: General Electric Company, Schenectady, NY (US)

( * ) Notice: Subject to any disclaimer, the term of this patent is extended or adjusted under 35 U.S.C. 154(b) by 795 days.

(21) Appl. No.: 13/797,912

(22) Filed: Mar. 12, 2013

(65) Prior Publication Data

US 2014/0260300 A1 Sep. 18, 2014

(51) Int. Cl.
*F23R 3/28* (2006.01)
*F23R 3/04* (2006.01)
*F23R 3/10* (2006.01)

(52) U.S. Cl.
CPC ............... *F23R 3/286* (2013.01); *F23R 3/04* (2013.01); *F23R 3/10* (2013.01); *F23R 3/283* (2013.01); *Y02T 50/675* (2013.01)

(58) Field of Classification Search
CPC ...... F23R 3/04; F23R 3/06; F23R 3/10; F23R 3/283; F23R 3/286; F23R 3/32; F23R 3/46; F23R 3/26; F23R 3/54; F23D 14/62; F23D 14/64
See application file for complete search history.

(56) References Cited

U.S. PATENT DOCUMENTS

| 1,855,165 | A |   | 4/1932  | Barker |
|-----------|---|---|---------|--------|
| 2,564,042 | A |   | 8/1951  | Walker |
| 3,581,492 | A | * | 6/1971  | Norgren .................... F23R 3/06 431/352 |
| 3,751,911 | A |   | 8/1973  | De Tartaglia |
| 4,050,238 | A | * | 9/1977  | Holzapfel ................. F23R 3/30 431/116 |
| 4,100,733 | A |   | 7/1978  | Striebel et al. |
| 4,399,652 | A | * | 8/1983  | Cole ........................ F02C 3/22 60/39.465 |
| 4,408,461 | A |   | 10/1983 | Bruhwiler et al. |

(Continued)

OTHER PUBLICATIONS

U.S. Appl. No. 13/797,848, filed Mar. 12, 2013, Boardman et al.

(Continued)

*Primary Examiner* — Gerald L Sung
*Assistant Examiner* — Rene Ford
(74) *Attorney, Agent, or Firm* — Fletcher Yoder, P.C.

(57) ABSTRACT

A system includes a multi-tube fuel nozzle of a turbine combustor. The multi-tube fuel nozzle includes a support structure defining an interior volume configured to receive an air flow; a plurality of mixing tubes disposed within the interior volume, wherein each of the plurality of mixing tubes comprises a respective fuel injector; and an outer annular wall configured to direct an air flow from an annulus between a liner and a flow sleeve of the turbine combustor at least partially radially inward into the interior volume through an air inlet and toward the plurality of mixing tubes, wherein the outer annular wall at least partially defines an air flow passage extending from the annulus to the interior volume.

20 Claims, 4 Drawing Sheets

(56) References Cited

U.S. PATENT DOCUMENTS

| | | |
|---|---|---|
| 4,587,809 A | 5/1986 | Ohmori et al. |
| 4,763,481 A | 8/1988 | Cannon |
| 4,796,429 A | 1/1989 | Verdouw |
| 5,121,597 A | 6/1992 | Urushidani et al. |
| 5,161,366 A | 11/1992 | Beebe |
| 5,235,814 A | 8/1993 | Leonard |
| 5,274,991 A | 1/1994 | Fitts |
| 5,361,586 A | 11/1994 | McWhirter et al. |
| 5,410,884 A | 5/1995 | Fukue et al. |
| 5,415,000 A | 5/1995 | Mumford et al. |
| 5,515,680 A | 5/1996 | Fujimura et al. |
| 5,611,196 A | 3/1997 | Wilson |
| 5,675,971 A | 10/1997 | Angel et al. |
| 5,778,676 A | 7/1998 | Joshi et al. |
| 5,816,049 A | 10/1998 | Joshi |
| 5,822,992 A | 10/1998 | Dean |
| 5,901,555 A | 5/1999 | Mandai et al. |
| 5,927,076 A | 7/1999 | Pillsbury |
| 5,943,866 A | 8/1999 | Lovett et al. |
| 6,016,658 A | 1/2000 | Willis et al. |
| 6,026,645 A | 2/2000 | Stokes et al. |
| 6,038,861 A | 3/2000 | Amos et al. |
| 6,092,363 A | 7/2000 | Ryan |
| 6,164,055 A | 12/2000 | Lovett et al. |
| 6,334,309 B1 | 1/2002 | Dean et al. |
| 6,351,948 B1 | 3/2002 | Goeddeke |
| 6,360,776 B1 | 3/2002 | McCormick et al. |
| 6,363,724 B1 | 4/2002 | Bechtel et al. |
| 6,438,959 B1 | 8/2002 | Dean et al. |
| 6,438,961 B2 | 8/2002 | Tuthill et al. |
| 6,530,222 B2 | 3/2003 | Stuttaford et al. |
| 6,532,742 B2 | 3/2003 | Scarinci et al. |
| 6,705,087 B1 | 3/2004 | Ohri et al. |
| 6,832,483 B2 | 12/2004 | Moriya et al. |
| 6,880,340 B2 | 4/2005 | Saitoh |
| 6,928,823 B2 | 8/2005 | Inoue et al. |
| 6,983,600 B1 | 1/2006 | Dinu et al. |
| 7,007,478 B2 | 3/2006 | Dinu |
| 7,007,486 B2 | 3/2006 | Sprouse et al. |
| 7,021,562 B2 | 4/2006 | Mansour et al. |
| 7,134,287 B2 | 11/2006 | Belsom et al. |
| 7,171,813 B2 | 2/2007 | Tanaka et al. |
| 7,181,916 B2 | 2/2007 | Ziminsky et al. |
| 7,469,544 B2 | 12/2008 | Farhangi |
| 7,578,130 B1 | 8/2009 | Kraemer et al. |
| 7,617,682 B2 | 11/2009 | Bruck |
| 7,841,182 B2 | 11/2010 | Martin |
| 7,900,456 B2 | 3/2011 | Mao |
| 8,042,339 B2 | 10/2011 | Lacy et al. |
| 8,065,880 B2 | 11/2011 | Ishizaka et al. |
| 8,079,218 B2 | 12/2011 | Widener |
| 8,104,291 B2 | 1/2012 | Myers et al. |
| 8,122,721 B2 | 2/2012 | Johnson et al. |
| 8,205,452 B2 | 6/2012 | Boardman et al. |
| 8,234,871 B2 | 8/2012 | Davis, Jr. et al. |
| 8,234,872 B2 | 8/2012 | Berry et al. |
| 8,240,151 B2 | 8/2012 | Pelletier et al. |
| 8,266,912 B2 | 9/2012 | Berry et al. |
| 8,276,385 B2 | 10/2012 | Zuo et al. |
| 8,322,143 B2 | 12/2012 | Uhm et al. |
| 8,327,642 B2 | 12/2012 | Uhm et al. |
| 8,402,763 B2 | 3/2013 | Mulherin et al. |
| 8,408,004 B2 | 4/2013 | Davis, Jr. et al. |
| 8,424,311 B2 | 4/2013 | York et al. |
| 8,438,853 B2 | 5/2013 | Green et al. |
| 8,474,265 B2 | 7/2013 | Jain et al. |
| 8,484,978 B2 | 7/2013 | Bailey et al. |
| 8,505,304 B2 | 8/2013 | Myers et al. |
| 8,522,555 B2 | 9/2013 | Berry et al. |
| 8,528,334 B2 | 9/2013 | Dutta et al. |
| 8,528,336 B2 | 9/2013 | Cihlar et al. |
| 8,528,839 B2 | 9/2013 | Bailey et al. |
| 8,572,979 B2 | 11/2013 | Smith et al. |
| 8,616,002 B2 | 12/2013 | Kraemer et al. |
| 8,701,419 B2 | 4/2014 | Hughes |
| 8,789,372 B2 | 7/2014 | Johnson et al. |
| 8,850,821 B2 | 10/2014 | Khan et al. |
| 8,899,049 B2 | 12/2014 | Krull et al. |
| 8,904,797 B2 | 12/2014 | Berry et al. |
| 8,919,127 B2 | 12/2014 | Melton et al. |
| 8,938,978 B2 | 1/2015 | Bailey et al. |
| 9,032,704 B2 | 5/2015 | Crothers et al. |
| 9,151,502 B2 | 10/2015 | Crothers et al. |
| 9,163,839 B2 | 10/2015 | Westmoreland et al. |
| 9,200,571 B2 | 12/2015 | Bailey et al. |
| 9,255,711 B2 | 2/2016 | Crothers et al. |
| 2001/0052229 A1 | 12/2001 | Tuthill et al. |
| 2002/0014078 A1 | 2/2002 | Mandai et al. |
| 2002/0119412 A1 | 8/2002 | Loving |
| 2002/0128790 A1 | 9/2002 | Woodmansee |
| 2002/0192615 A1 | 12/2002 | Moriya et al. |
| 2003/0014975 A1 | 1/2003 | Nishida et al. |
| 2003/0037549 A1 | 2/2003 | Mandai et al. |
| 2003/0089801 A1 | 5/2003 | Saitoh et al. |
| 2004/0006990 A1 | 1/2004 | Stuttaford et al. |
| 2004/0006991 A1 | 1/2004 | Stuttaford et al. |
| 2004/0006992 A1 | 1/2004 | Stuttaford et al. |
| 2004/0006993 A1 | 1/2004 | Stuttaford et al. |
| 2004/0060297 A1 | 4/2004 | Koenig et al. |
| 2004/0142294 A1 | 7/2004 | Niass et al. |
| 2004/0163392 A1 | 8/2004 | Nishida et al. |
| 2005/0268617 A1 | 12/2005 | Amond, III et al. |
| 2007/0289305 A1 | 12/2007 | Oda et al. |
| 2008/0053097 A1 | 3/2008 | Han et al. |
| 2008/0078179 A1 | 4/2008 | Cai |
| 2008/0163627 A1 | 7/2008 | ELKady et al. |
| 2009/0223225 A1 | 9/2009 | Kraemer et al. |
| 2009/0241547 A1 | 10/2009 | Luts et al. |
| 2009/0280443 A1 | 11/2009 | Carroni et al. |
| 2010/0064691 A1 | 3/2010 | Laster et al. |
| 2010/0089065 A1 | 4/2010 | Tuthill |
| 2010/0192579 A1 | 8/2010 | Boardman et al. |
| 2010/0192583 A1 | 8/2010 | Cano Wolff et al. |
| 2010/0192586 A1 | 8/2010 | Terada et al. |
| 2010/0205970 A1 | 8/2010 | Hessler et al. |
| 2010/0218501 A1 | 9/2010 | York et al. |
| 2010/0236247 A1 | 9/2010 | Davis, Jr. et al. |
| 2010/0236252 A1 | 9/2010 | Huth |
| 2010/0263384 A1* | 10/2010 | Chila ............... F23R 3/10 60/755 |
| 2011/0016866 A1 | 1/2011 | Boardman et al. |
| 2011/0113783 A1 | 5/2011 | Boardman et al. |
| 2011/0197591 A1 | 8/2011 | Valeev et al. |
| 2011/0209481 A1 | 9/2011 | Simmons |
| 2011/0314823 A1 | 12/2011 | Smith et al. |
| 2012/0045725 A1* | 2/2012 | Takiguchi ......... F23R 3/14 431/60 |
| 2012/0047902 A1 | 3/2012 | Tuthill |
| 2012/0055167 A1* | 3/2012 | Johnson ........... F01D 9/023 60/776 |
| 2012/0073302 A1 | 3/2012 | Myers et al. |
| 2012/0085100 A1* | 4/2012 | Hughes ............. F23R 3/286 60/776 |
| 2012/0111012 A1* | 5/2012 | Axelsson .......... F23R 3/14 60/737 |
| 2012/0111013 A1* | 5/2012 | Parsania .......... F23C 7/004 60/737 |
| 2012/0180487 A1 | 7/2012 | Uhm et al. |
| 2012/0180488 A1 | 7/2012 | Bailey et al. |
| 2012/0227371 A1 | 9/2012 | Johnson et al. |
| 2012/0297785 A1 | 11/2012 | Melton et al. |
| 2012/0324896 A1 | 12/2012 | Kim et al. |
| 2013/0025285 A1* | 1/2013 | Stewart ............ F23R 3/10 60/740 |
| 2013/0061594 A1* | 3/2013 | Stewart ............ F23R 3/26 60/740 |
| 2013/0067920 A1 | 3/2013 | Fox et al. |
| 2013/0074503 A1 | 3/2013 | Rohrssen et al. |
| 2013/0086912 A1 | 4/2013 | Berry |
| 2013/0104554 A1 | 5/2013 | Bode et al. |
| 2013/0125549 A1 | 5/2013 | Bailey et al. |
| 2013/0180256 A1 | 7/2013 | Stoia |

(56) References Cited

U.S. PATENT DOCUMENTS

| | | | |
|---|---|---|---|
| 2013/0205799 A1* | 8/2013 | Bailey | F23R 3/14 60/785 |
| 2013/0232977 A1 | 9/2013 | Siddagangaiah et al. | |
| 2013/0232979 A1 | 9/2013 | Singh | |
| 2013/0299602 A1 | 11/2013 | Hughes et al. | |
| 2014/0033718 A1 | 2/2014 | Manoharan et al. | |
| 2014/0033722 A1 | 2/2014 | Abdel-Hafez et al. | |
| 2014/0090400 A1* | 4/2014 | Stuttaford | F23R 3/16 60/796 |
| 2014/0109587 A1 | 4/2014 | Crothers et al. | |
| 2014/0245738 A1 | 9/2014 | Crothers et al. | |
| 2014/0260259 A1 | 9/2014 | Ginesin et al. | |
| 2014/0260267 A1 | 9/2014 | Melton et al. | |
| 2014/0260268 A1 | 9/2014 | Westmoreland et al. | |
| 2014/0260271 A1 | 9/2014 | Keener et al. | |
| 2014/0260276 A1 | 9/2014 | Westmoreland et al. | |
| 2014/0260299 A1 | 9/2014 | Boardman et al. | |
| 2014/0260300 A1 | 9/2014 | Chila et al. | |
| 2014/0260315 A1 | 9/2014 | Westmoreland et al. | |
| 2014/0283522 A1 | 9/2014 | Boardman et al. | |
| 2014/0338338 A1 | 11/2014 | Chila et al. | |
| 2014/0338339 A1 | 11/2014 | Westmoreland et al. | |
| 2014/0338340 A1 | 11/2014 | Melton et al. | |
| 2014/0338344 A1 | 11/2014 | Stewart et al. | |
| 2014/0338354 A1 | 11/2014 | Stewart et al. | |
| 2014/0338355 A1 | 11/2014 | Stewart et al. | |
| 2014/0338356 A1 | 11/2014 | Keener et al. | |
| 2014/0367495 A1 | 12/2014 | Monaghan et al. | |
| 2015/0000285 A1 | 1/2015 | Deiss et al. | |
| 2015/0059353 A1 | 3/2015 | Asai et al. | |
| 2015/0165568 A1 | 6/2015 | Means et al. | |
| 2016/0040883 A1 | 2/2016 | Asai et al. | |
| 2016/0060154 A1 | 3/2016 | Cowles et al. | |

OTHER PUBLICATIONS

U.S. Appl. No. 13/797,859, filed Mar. 12, 2013, Boardman et al.
U.S. Appl. No. 13/797,883, filed Mar. 12, 2013, Melton et al.
U.S. Appl. No. 13/797,896, filed Mar. 12, 2013, Westmoreland et al.
U.S. Appl. No. 13/797,925, filed Mar. 12, 2013, Westmoreland et al.
U.S. Appl. No. 13/797,961, filed Mar. 12, 2013, Westmoreland et al.
U.S. Appl. No. 13/797,986, filed Mar. 12, 2013, Chila et al.
U.S. Appl. No. 13/798,012, filed Mar. 12, 2013, Melton et al.
U.S. Appl. No. 13/798,027, filed Mar. 12, 2013, Westmoreland et al.
U.S. Appl. No. 13/400,248, filed Feb. 20, 2012, Westmoreland et al.
U.S. Appl. No. 13/705,443, filed Dec. 5, 2012, Belsom et al.

\* cited by examiner

AIR DIFFUSER FOR A HEAD END OF A COMBUSTOR

BACKGROUND OF THE INVENTION

The subject matter disclosed herein relates generally to turbine combustors, and, more particularly, to an air diffuser for the turbine combustors.

A gas turbine engine combusts a mixture of fuel and air to generate hot combustion gases, which in turn drive one or more turbine stages. In particular, the hot combustion gases force turbine blades to rotate, thereby driving a shaft to rotate one or more loads, e.g., an electrical generator. The gas turbine engine includes a fuel nozzle assembly, e.g., with multiple fuel nozzles, to inject fuel and air into a combustor. The design and construction of the fuel nozzle assembly can significantly affect the mixing and combustion of fuel and air, which in turn can impact exhaust emissions (e.g., nitrogen oxides, carbon monoxide, etc.) and power output of the gas turbine engine. Furthermore, the design and construction of the fuel nozzle assembly can significantly affect the time, cost, and complexity of installation, removal, maintenance, and general servicing. Therefore, it would be desirable to improve the design and construction of the fuel nozzle assembly.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a multi-tube fuel nozzle of a turbine combustor. The multi-tube fuel nozzle includes a support structure defining an interior volume configured to receive an air flow, and a plurality of mixing tubes disposed within the interior volume, wherein each of the plurality of mixing tubes includes a respective fuel injector. The multi-tube fuel nozzle also includes an outer annular wall configured to direct an air flow from an annulus between a liner and a flow sleeve of the turbine combustor at least partially radially inward into the interior volume through an air inlet and toward the plurality of mixing tubes. The outer annular wall at least partially defines an air flow passage extending from the annulus to the interior volume.

In a second embodiment, a system includes a multi-tube fuel nozzle assembly of a combustor. The multi-tube fuel nozzle assembly includes a support structure defining an interior volume, and the interior volume is configured to receive an air flow. The multi-tube fuel nozzle assembly further includes an air diffuser on a side wall of the support structure; a plurality of mixing tubes within the interior volume, and each of the plurality of mixing tubes is configured to receive the air flow from the interior volume; and a plurality of fuel injectors. Each of the fuel injectors is at least partially disposed within a respective one of the plurality of mixing tubes and is configured to inject a fuel flow into the respective one of the mixing tubes.

In a third embodiment, a method includes directing an air flow with an air diffuser from an axial flow direction to a radial flow direction and into an interior volume comprising a plurality of mixing tubes, wherein each of the plurality of mixing tubes comprising a mixing chamber; injecting fuel from a plurality of fuel injectors into the plurality of mixing tubes, and each of the plurality of fuel injectors is positioned within one of the plurality of mixing tubes; mixing the air flow and the fuel within the mixing chamber of each mixing tube of the plurality of mixing tubes to create a fuel-air mixture; and outputting the fuel-air mixture from each mixing chamber into a combustion chamber of a turbine combustor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine engines may include components for premixing fuel and air prior to combustion within a combustion chamber. The disclosed embodiments are directed towards a fuel and air premixing system having an air diffuser, wherein the air diffuser is configured to distribute air to a plurality of mixing tubes (e.g., air-fuel mixing tubes). In certain embodiments, the air diffuser may be disposed on a side wall of the combustor, and may impart a radially inward redirection to an air flow in order to provide more even tube-to-tube air distribution while maintaining axial velocity and reducing flow separation. The presently described embodiments may also provide lower manufacturing costs, more uniform air distribution, longer equipment lifetime, and/or lower emissions, for example.

Figure 1:
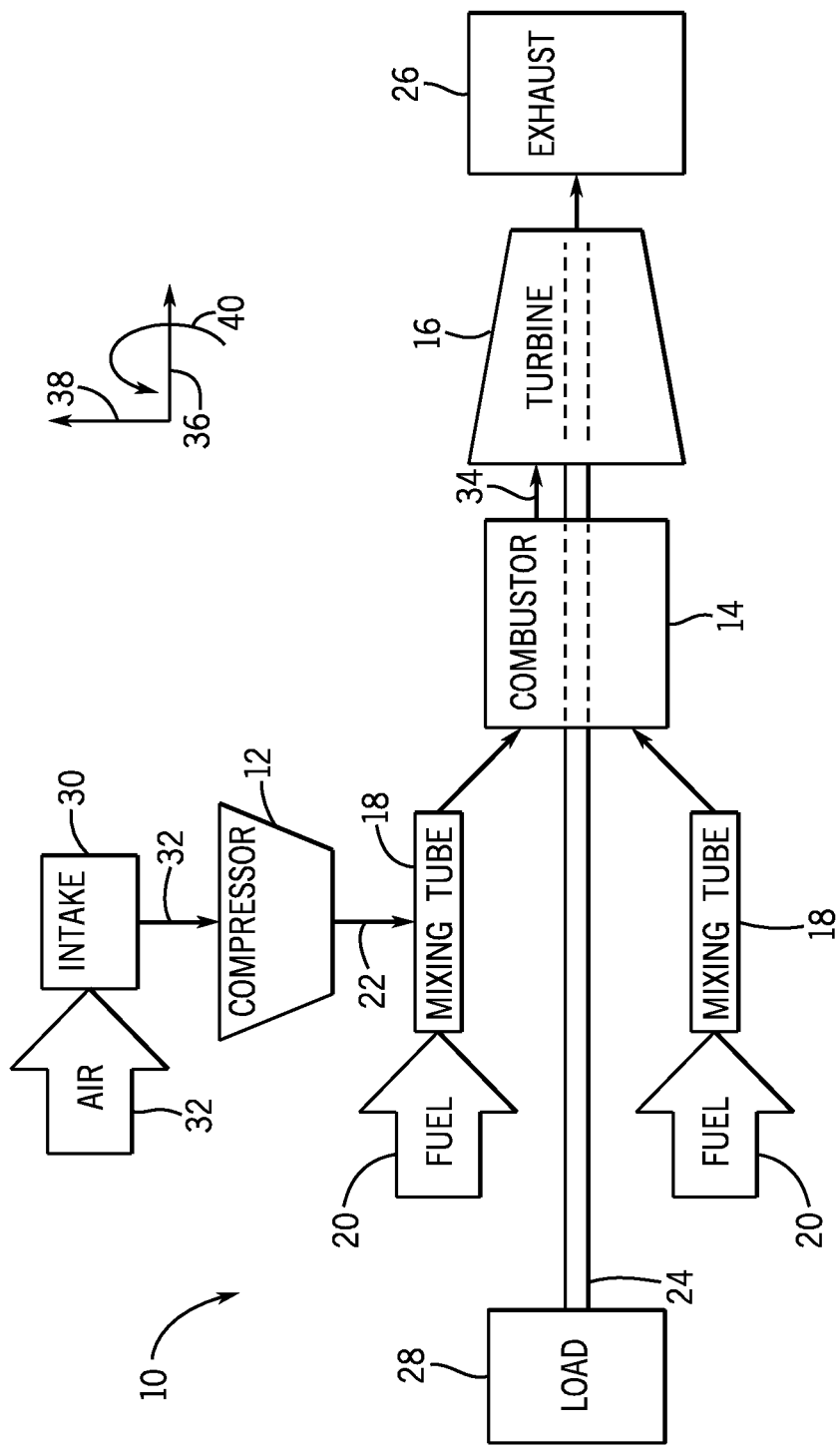
FIG. 1 is a block diagram of an embodiment of a turbine system having a multi-tube fuel nozzle.

Turning to the drawings, FIG. 1 illustrates a block diagram of an embodiment of a gas turbine system 10. As described in detail below, the disclosed turbine system 10 may employ an integral air diffuser. As shown, the system 10 also includes a compressor 12, a turbine combustor 14, and a turbine 16. The turbine combustor 14 may include one or more mixing tubes 18 (e.g., 10 to 1000 mixing tubes), e.g., in one or more multi-tube fuel nozzles. The mixing tubes 18 may be configured to receive both fuel 20 and pressurized oxidant 22, such as air, oxygen, oxygen-enriched air, oxygen reduced air, or any combination thereof. Although the following discussion refers to the oxidant as air 22, any suitable oxidant may be used with the disclosed embodiments. The mixing tubes 18 may be described as micromixing tubes, which may have diameters between approximately 0.5 to 2, 0.75 to 1.75, or 1 to 1.5 centimeters. The mixing tubes 18 may be arranged in one or more bundles of closely spaced tubes, generally in a parallel arrangement relative to one another. In this configuration, each mixing tube 18 is configured to mix (e.g., micromix) on a relatively small scale within each mixing tube 18, which then outputs a fuel-air mixture into the combustion chamber. In certain embodiments, the system 10 may use a liquid fuel and/or gas fuel 20, such as natural gas or syngas. Furthermore, the combustor 14 may contain the air diffuser mentioned above and described in more detail in FIG. 2, which may be configured to direct an air flow to a plurality of mixing tubes 18. The air diffuser may condition the flow of the pressurized air 22 to improve the uniformity of the distribution to the mixing tubes 18, and may also be integral to the combustor. Furthermore, the air diffuser may impart a radially inward redirection to the air flow, which may contribute to a desirable air velocity distribution across the mixing tubes 18.

Compressor blades are included as components of the compressor 12. The blades within the compressor 12 are coupled to a shaft 24, and will rotate as the shaft 24 is driven to rotate by the turbine 16, as described below. The rotation of the blades within the compressor 12 compresses air 32 from an air intake 30 into pressurized air 22. The pressurized air 22 is then fed into the mixing tubes 18 of the turbine combustors 14. The pressurized air 22 and fuel 20 are mixed within the mixing tubes 18 to produce a suitable fuel-air mixture ratio for combustion (e.g., a combustion that causes the fuel to more completely burn) so as not to waste fuel 20 or cause excess emissions.

The turbine combustors 14 ignite and combust the fuel-air mixture, and then pass hot pressurized combustion gasses 34 (e.g., exhaust) into the turbine 16. Turbine blades are coupled to the shaft 24, which is also coupled to several other components throughout the turbine system 10. As the combustion gases 34 flow against and between the turbine blades in the turbine 16, the turbine 16 is driven into rotation, which causes the shaft 24 to rotate. Eventually, the combustion gases 34 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth. In the following discussion, reference may be made to an axial axis or direction 36, a radial axis or direction 38, and/or a circumferential axis or direction 40 of the turbine system 10. In the manner described below, the air diffuser for the combustor 14 may enable more desirable air flow to the mixing tubes 18 and may contribute to a durable, reliable, and more easily manufactured micromixing system.

Figure 2:
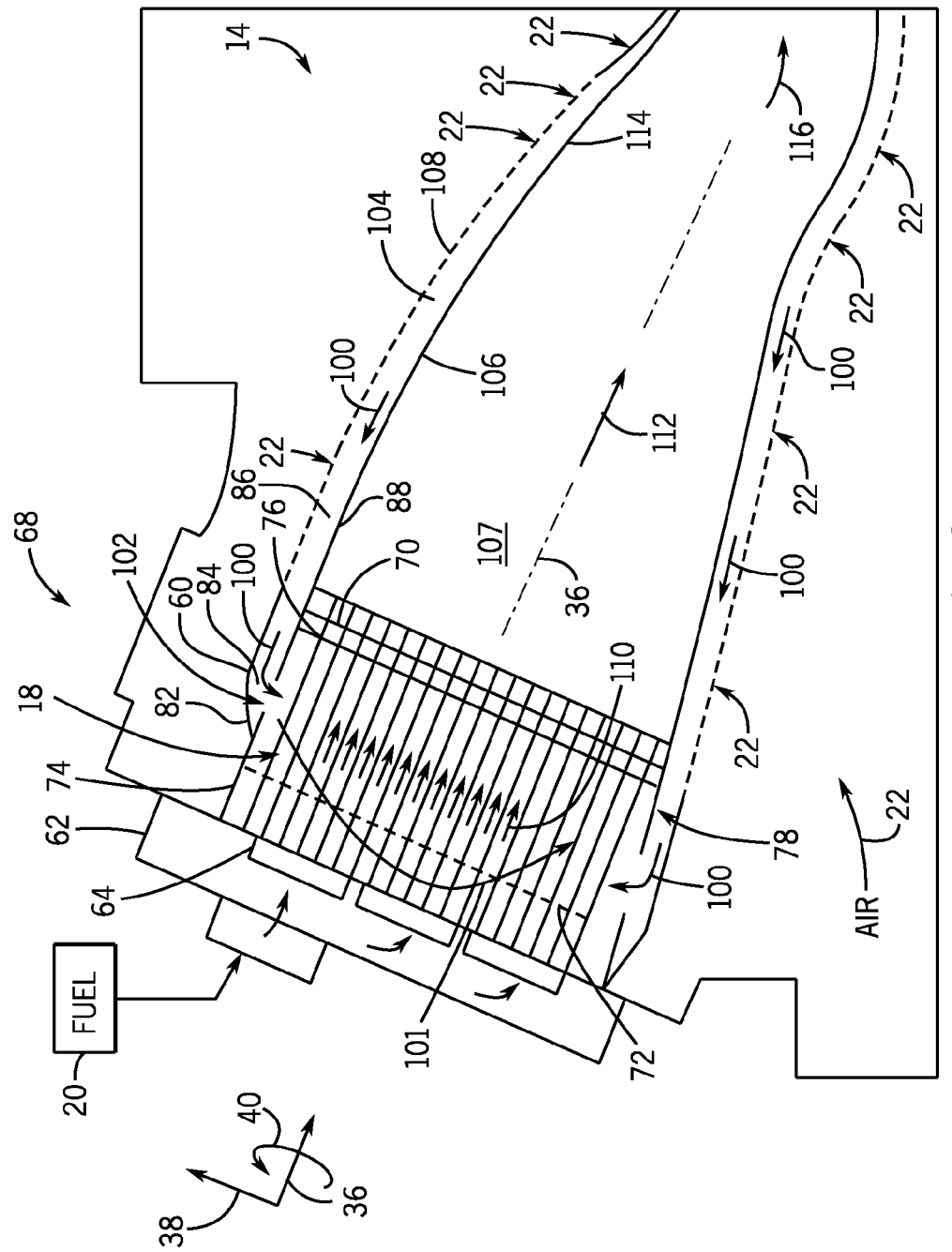
FIG. 2 is a cross-sectional side view of a portion of a turbine combustor of FIG. 1 having an integral air diffuser.

FIG. 2 is a cross-sectional schematic of an embodiment of the combustor 14 of FIG. 1 having an air diffuser 60, which may distribute pressurized air 22 to the plurality of mixing tubes 18. As shown, the combustor 14 further includes an end cover 62, a fuel plenum 64, and a combustion chamber 107. The plurality of mixing tubes 18 are positioned within a head end 68 of the combustor 14. The mixing tubes 18 may generally extend between a cap face 70 and the end cover 62 and may extend in the axial direction 36. In some embodiments, the mixing tubes 18 are suspended in the head end 68 such that the mixing tubes 18 may not be attached to the end cover 62 or the cap face 70. Alternatively, however, the mixing tubes 18 may be coupled to at least one of the cap face 70 and/or the end cover 62. In addition, the mixing tubes 18 may pass through an air distributor plate 72, which may provide structural and damping support to the mixing tubes 18. The distributor plate 72 may have apertures that correspond to mixing tubes 18, such that the mixing tubes 18 extend through the apertures. The distributor plate 72 may be removably coupled to a support structure 74, which may be a barrel-shaped structure that extends circumferentially 40 about the mixing tubes 18, the air distributor plate 72, and other components of the combustor 14.

The end cover 62 may also include the fuel plenum 64 for providing fuel 20 to the mixing tubes 18. The fuel plenum 64 routes fuel to the mixing tubes 18 in the axial direction 36, whereas the mixing tubes 18 receive air in the radial direction 38. The cap face 70 may be removably coupled to the head end 68 of the combustor 14 (e.g., with a radial spring or with fasteners, such as bolts) so that it may be detached from the support structure 74. Furthermore, a retainer plate 76 may be coupled to the support structure 74, upstream of the cap face 70. Like the cap face 70, the retainer plate 76 may be removably coupled (e.g., bolted, threaded, etc.) to the support structure 74 such that it may be removed to allow for inspection, maintenance, and/or removal of the mixing tubes 18 and other components of the head end 68. The retainer plate 76 may provide additional support for a downstream end 78 of the mixing tubes 18.

The integral air diffuser 60 (e.g., a flow distributor, a baffle, a conduit, or a turning vane) may improve distribution of the pressurized air 22 within the head end 68 of the combustor 14. The diffuser 60 may be an annular flow conditioning diffuser 60 configured to distribute the pressurized air 22 forward (e.g., in an upstream direction), radially 38 inward, and/or externally across the plurality of mixing tubes 18. For example, the diffuser 60 may include a tapered annular wall 82, which gradually converges (e.g., angles or curves) inwardly toward an air cavity 84 (e.g., opening) and mixing tubes 18 in the radial direction 38. The diffuser 60 also may include an annular internal passage 86, which generally diverges or grows in cross-sectional area as it approaches the cavity 84 and the mixing tubes 18. In some embodiments, the diffuser 60 may diffuse the pressurized air 22, such that the pressurized air 22 is substantially evenly distributed to each mixing tube 18.

The air diffuser 60 may be disposed on a side wall 88 of the support structure 74, which may extend circumferentially around the mixing tubes 18, the retainer plate 76, the air distributor plate 72, and other components of the combustor 14. For example, the air diffuser 60 may be disposed on the side wall 88 at a point in between the end cover 62 and the cap face 70. The tapered annular wall 82 may join the side wall 88 at an angle (e.g., 5, 10, 15, 20, 30, 45, 60, 75, or 90 degrees, or any ranges there between) that may allow the axially 36 approaching pressurized air 22 to flow towards the mixing tubes 18 while maintaining axial momentum (e.g., along the axial direction 36) as it is radially 38 redirected inward. By redirecting the air radially 38 inward, the air diffuser 60 may provide more even tube 18 to tube 18 distribution of pressurized air 22 flow while reducing flow separation (e.g., from the diffuser 60 walls) and reducing pressure loss. In certain embodiments, the combustor 14 may have one or more air diffusers 60. For example, there may be one, two, three, or more air diffusers 60 for each fuel plenum 64. As such, a plurality of air diffusers 60 may extend circumferentially 40 around the combustor 14.

As described above, the compressor 12 receives air 32 from the air intake 30, compresses the air 32, and produces the flow of pressurized air 22 for use in the combustion process. As shown by arrow 100, the pressurized air 22 is provided to the head end 68 of the combustor 14 through an air inlet 102 (e.g., an annular air inlet or a plurality of circumferentially spaced air inlets), which may be downstream of the respective fuel injector 66 (see FIG. 3) of each of the plurality of mixing tubes 18. The air inlet 102 directs the air 22 laterally or radially 38 inward towards side walls of the mixing tubes 18. More specifically, the pressurized air 22 flows in the direction indicated by arrow 100 from the compressor 12 through an annulus 104 between a liner 106 and a flow sleeve 108 of the combustor 14 to reach the head end 68. The liner 106 is positioned circumferentially 40 about the combustion chamber 107, the annulus 104 is positioned circumferentially 40 about liner 106, and the flow sleeve 108 is positioned circumferentially 40 about the annulus 104. Upon reaching the head end 68, the air 22 at least partially turns from the axial direction 36 to the radial direction 38 through the inlet 102 toward the mixing tubes 18, as indicated by arrows 101.

The pressurized air 22 passes through a plurality of apertures in the distributor plate 72 (e.g., apertures supporting the tubes 18 and/or between the tubes 18), enters each of the mixing tubes 18 through one or more side openings, and is mixed with the fuel 20 within the plurality of mixing tubes 18. As will be appreciated, the air distributor plate 72 (e.g., via the apertures) may increase the uniformity of the air 22 passing into each of the mixing tubes 18. Each mixing tube 18 receives the fuel 20 in the axial direction 36 through an axial end portion of the mixing tube 18, while also receiving the air 22 through a plurality of side openings in the mixing tube 18. Thus, the fuel 20 and the air 22 mix within each individual mixing tube 18. As shown by arrows 110, the fuel-air mixture flows downstream within the mixing tubes 18 into the combustion chamber 107, where the fuel-air mixture is ignited and combusted to form the combustion gases 34 (e.g., exhaust). The combustion gases 34 flow in a direction 112 toward a transition piece 114 of the turbine combustor 14. The combustion gases 34 pass through the transition piece 114, as indicated by arrow 116, toward the turbine 16, where the combustion gases 34 drive the rotation of the blades within the turbine 16.

The air diffuser 60 may be configured to direct pressurized air 22 to the plurality of mixing tubes 18. More specifically, the air diffuser 60 may direct the pressurized air 22 from an axial 36 direction to a radially 38 inward direction, which may minimize circumferential 40 blockage to the radial 38 migration of airflow, reduce flow separation, and reduce pressure loss, while distributing air 22 evenly to the plurality of mixing tubes 18.

Figure 3:
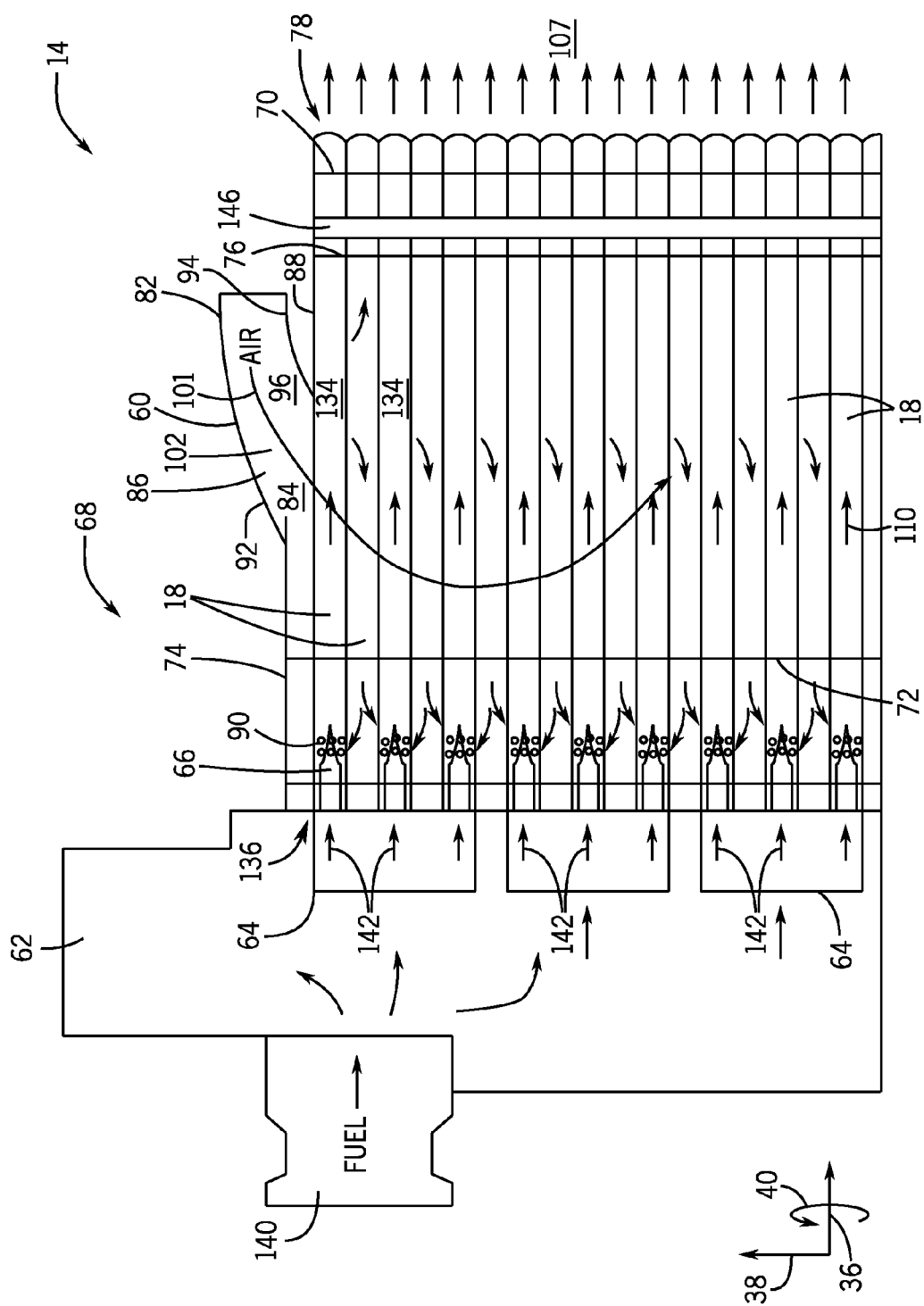
FIG. 3 is a cross-sectional side view of a portion of the turbine combustor of FIG. 2 having the integral air diffuser of FIG. 2.

FIG. 3 is a cross-sectional side view of a portion of the plurality of mixing tubes 18 and the air diffuser 60 within the combustor 14. The air diffuser 60 includes an annular internal passage 86 having an outer side 92 (e.g., an outer annular wall) and an inner side 94 (e.g., an inner annular wall), which approaches the side wall 88 of the support structure 74 in the axial direction 36. The outer side 92 may include a curved profile extending from the flow sleeve 108 to the support structure 72. The inner side 94 may be parallel to the liner 106, and may furthermore at least partially define the annular internal passage 86 (e.g., the air flow passage). Additionally, the outer side 92 may have a first radius of curvature and the inner side 94 may have a second curvature. The first radius of curvature and the second radius of curvature may be substantially equal, or the first radius of curvature may be greater than the second radius of curvature.

The combustor 14 may also include the mixing tubes 18, the end cover 62, the fuel plenums 64, and a plurality of fuel injectors 66. As shown, each mixing tube 18 has a passage or chamber 134 extending between a first end 136 (e.g., axial end opening) and the downstream end 78 (e.g., axial end opening) of the mixing tube 18. In some embodiments, the downstream end 78 of the mixing tube 18 may extend through the cap face 70, so that the fuel-air mixture may be output from the mixing tube 18 into the combustion chamber 107 through an axial end opening generally located at the downstream end 78 of the mixing tube 18.

In some embodiments, the end cover 62 may be positioned upstream of, and proximate to, the first end 136 of the mixing tube 18. The end cover 62 may include one or more fuel inlets 140 through which the fuel 20 is provided to one or more fuel plenums 64 (e.g., 1, 2, 3, 4, 5, 6, 7, 8, 9, 10, or more) within the end cover 62. Furthermore, each fuel plenum 64 may be fluidly connected to one or more fuel injectors 66 (e.g., 1, 2, 3, 4, 5, 6, 7, 8, 9, 10, or more). As illustrated, each mixing tube 18 includes a respective fuel injector 66, which receives the fuel 20 in the axial direction 36 as indicated by arrows 142. In some embodiments, the end cover 62 may include a single common fuel plenum 64 (e.g., fuel supply chamber) for all of the mixing tubes 18 and associated fuel injectors 66. In other embodiments, the system 10 may include one, two, three, or more fuel plenums 64 that each provides fuel 20 to a subgroup of fuel injectors 66, and ultimately to the mixing tube 18 associated with each fuel injector 66. For example, one fuel plenum 64 may provide fuel to about 5, 10, 50, 100, 500, 1000, or more fuel injectors 66. In some embodiments, the combustor 14 having subgroups of fuel injectors 66 supplied by different fuel plenums 64 may allow one or more subgroups of fuel injectors 66 and corresponding mixing tubes 18 to be run richer or leaner than others, which in turn may allow for more control of the combustion process, for example. Additionally, multiple fuel plenums 64 may enable the use of multiple types of fuel 20 (e.g., at the same time) with the combustor 14.

The support structure 74 may surround the head end 68 of the combustor 14, and the support structure 74 may generally protect and/or support the mixing tubes 18 and other structures within the head end 68, such as the retainer plate 76 and the distributor plate 72. As described above, in some embodiments, pressurized air 22 may enter the head end 68 through the air inlet 102. More specifically, pressurized air 22 may flow through the air inlet 102 laterally into the air cavity 84 within the head end 68 (e.g., in a generally radial direction 38 as indicated by arrow 101). The air cavity 84 includes the volume of space in between the plurality of mixing tubes 18 and surrounded by the support structure 74 (e.g., outer wall). The pressurized air 22 spreads throughout the air cavity 84 as the pressurized air 22 flows to each of the plurality of mixing tubes 18.

As described in FIG. 2 and further depicted in FIG. 3, the air diffuser 60 may improve distribution of the pressurized air 22 within the head end 68. In certain embodiments, the diffuser 60 may be integral to (e.g., one piece with) the support structure 74 of the combustor 14, and may be disposed in between the end cover 62 and the cap face 70. For example, the air diffuser 60 may be disposed downstream (e.g., relative to the flow of fuel 20) of a plurality of apertures 90 extending through the sidewalls of each of the mixing tubes 18, which may be configured to receive the pressurized air 22. The air diffuser 60 may be configured to distribute the pressurized air 22 forward, radially 38 inward, and/or externally across the plurality of mixing tubes 18. For example, the diffuser 60 may include the tapered annular wall 82, which gradually converges (e.g., angles or curves) inwardly toward the cavity 84 and mixing tubes 18 in the radial direction 38. The tapered annular wall 82 may join the support structure 74 at an angle that may allow the axially approaching pressurized air 22 to flow towards apertures 90 in the mixing tubes 18 while maintaining axial momentum (e.g., along the axial direction 36) as it is radially 38 redirected inward. The diffuser 60 also may include the annular internal passage 86, which generally diverges or grows in cross-sectional area toward the cavity 84 and the mixing tubes 18. In some embodiments, the diffuser 60 may diffuse the pressurized air 22 such that the pressurized air 22 is substantially evenly distributed to each mixing tube 18.

In certain embodiments, the annular internal passage 86 may have the outer side 92 and the inner side 94. The annular internal passage 86 may be angled toward the side wall 88, or may gradually curve towards the side wall 88. In some embodiments, the outer side 92 and the inner side 94 may run generally parallel to each other (e.g., the outer side 92 and the inner side 94 approach the side wall 88 at a substantially constant and/or equal angle), or they may diverge (e.g., flare) as they approach the side wall 88, so that the dimensions of a mouth 96 of the annular passage 86 are greater than the dimensions of the passage 86. In other words, the cross-sectional area of the passage 86 may increase as it approaches the mouth 96. For example, the inner side 94 may approach the side wall 88 at one angle relative to the axial direction 38, while the outer side 92 may approach the side wall 88 at a larger angle (e.g., 5, 10, 15, 20, 30, or 45 degrees larger) relative to the axial direction 38. By widening at the mouth 96 of the passage 86, the air diffuser 60 may allow the pressurized air 22 to maintain axial 36 velocity as it is radially 38 redirected to the apertures 90 in the mixing tubes 18.

The air distributor plate 72 may be provided within the cavity 84 of the head end 68, and may generally be positioned between the end cover 62 and the cap face 70. Perforations in the air distributor plate 72 may generally provide additional diffusion and distribution of the pressurized air 22, so as to improve distribution of the pressurized air 22 to the mixing tubes 18. As an example, after entering the head end 68 through the air inlet 102, the pressurized air 22 may flow across the mixing tubes 18 as it distributes through the air cavity 84. As the air 22 passes across the mixing tubes 18, the mixing tubes 18 themselves may provide cross-flow blockage, which may further contribute to the air 22 distribution to the mixing tubes 18. The air distributor plate 72 (e.g., via perforations) may then distribute the air to the apertures 90 in each mixing tube 18. The pressurized air 22 may then enter each mixing tube 18 through the apertures 90 in the mixing tubes 18.

The apertures 90 may help to distribute and mix the air 22 with fuel 20 in the mixing chamber 134 of each mixing tube 18. The apertures 90 may be configured to have any of a variety of shapes, sizes, and arrangements. For example, the apertures 90 may be generally circular, elliptical, or rectangular in cross-sectional shape. The apertures 90 may further have a diameter or a dimension in the range of from approximately 0.001 centimeters to approximately 1.5 or more centimeters. The apertures 90 may also have a diameter or dimension in the range of from approximately 0.01 to 1.0, 0.05 to 0.5, or 0.1 to 0.25 centimeters. In some embodiments, one or more rows of apertures 90 may be spaced (e.g., evenly) around the circumference of each of the mixing tubes 18. The apertures 90 formed in the mixing tubes 18 may have substantially similar shapes, sizes, and/or angles, while in other embodiments the apertures 90 may have different shapes, sizes, and/or angles. In general, the apertures 90 may be positioned at any location along the mixing tube 18. However, in certain embodiments, the apertures 90 may be positioned upstream from the position at which the fuel 20 enters the mixing tube 18 through the fuel injector 66. The apertures 90 may be upstream of the air inlet 102 relative to a flow direction through the plurality of mixing tubes 18. Furthermore, the apertures 90 may be spaced circumferentially 40 around the fuel injector 66, thereby directing the air radially 38 inward toward the fuel injector 66. Thus, the apertures 90 may help to promote mixing of the air 22 with the fuel 20, e.g., via cross-wise flows As shown in FIG. 3, in some embodiments, the combustor 14 also has the retainer plate 76 and an impingement plate 146. The retainer plate 76 and the impingement plate 146 may be positioned downstream of the fuel injectors 66 and generally proximate to the cap face 70. The cap face 70, the retainer plate 76, and/or the impingement plate 146 may be removable or separable from the support structure 74, for example. The retainer plate 76 may provide support for the mixing tubes 18, as it may be configured to couple to the downstream end (e.g., the downstream end 78) of each mixing tube 18. The impingement plate 146 may be positioned substantially adjacent to the cap face 70, and in some embodiments, the impingement plate 146 may be positioned between the retainer plate 76 and the cap face 70. The impingement plate 146 may support the mixing tubes 18, and may additionally or alternatively provide for cooling of the cap face 70 within the combustor 14. For example, the impingement plate 146 may include a plurality of impingement cooling holes, which are configured to impinge jets of air against a rear surface of the cap face 70 for impingement cooling.

As discussed above and as shown in FIG. 3, one fuel injector 66 is provided for each mixing tube 18 of the combustor 14. In other words, one fuel injector 66 is positioned within a portion of each mixing tube 18 in order to deliver fuel 20 into the respective mixing tube 18. In some embodiments, the fuel injector 66 may be generally coaxially positioned within each mixing tube 18 by inserting the fuel injector 66 axially 36 through the first end 136 of each mixing tube 18. In certain embodiments, the mixing tubes 18 may have a size, shape, and configuration that enable each mixing tube 18 to receive the corresponding fuel injector 66.

The integral air diffuser 60 may contribute to a durable, reliable, and more easily manufactured micromixing system by increasing the uniformity of air 22 distribution across the plurality of mixing tubes 18 within the head end 68 of the combustor 14. As such, the air diffuser 60 may increase the robustness of the gas turbine system 10 and reduce the lifecycle cost of the system 10.

Figure 4:
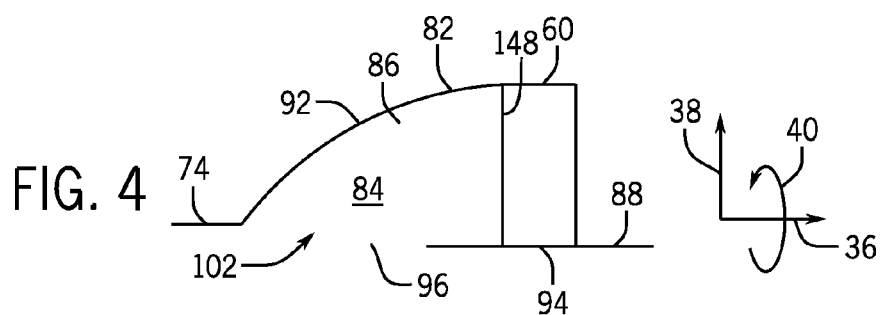
FIG. 4 is an embodiment of an integral diffuser.

FIGS. 4-7 show various embodiments of the air diffuser 60. Each embodiment includes the tapered annular wall 82, the air cavity 84, the annular internal passage 86, the outer side 92, and the inner side 94. As in FIGS. 2 and 3, the air diffuser 60 is disposed on the side wall 88 of the support structure 74, downstream (e.g., relative to the flow of fuel 20 in the mixing tubes 18) of the apertures 90 in the mixing tubes 18. In the embodiment of FIG. 4, the outer side 92 approaches the support structure 74 at an angle, while the inner side 94 is generally parallel to (e.g., aligned with) the outer wall 88. Furthermore, the outer side 92 approaches the support structure 74 at a gradually changing angle (e.g., a gradually increasing angle). In other words, the outer side 92 curves as it approaches the support structure 74. Because the inner side 94 is generally parallel to the outer wall 88, the air 22 flowing through the air diffuser 60 may have a higher axial 36 velocity and a lower radial 38 velocity as it enters the air cavity 84, which may enable the diffuser 60 to be located further downstream (e.g., relative to the flow of fuel 20 in the mixing tubes 18) of the apertures 90 in the mixing tubes 18. Additionally, a plurality of radial struts 148 may provide structural support to the annular internal passage 86 or may help secure the diffuser 60 to the support structure 74. As an example, one radial strut 148 is shown inside the air diffuser 60 in FIG. 4, but a plurality of struts 148 may extend inside or outside of the annular passage 86. If the struts 148 extend inside the inner annular passage 86, they may further condition the air 22 flow and contribute to its radial 38 redirection as it passes through the diffuser 60.

Figure 5:
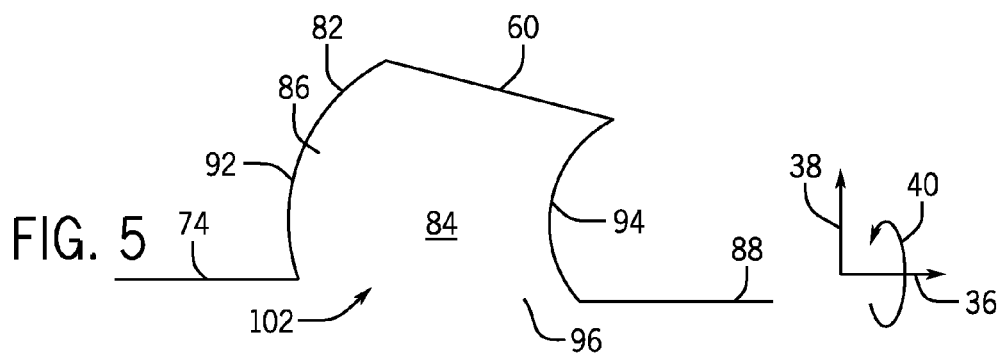
FIG. 5 is an embodiment of an integral diffuser.
Figure 6:
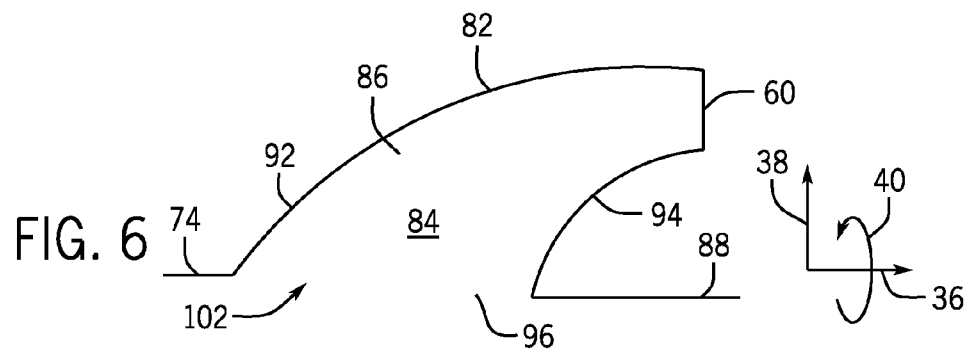
FIG. 6 is an embodiment of an integral diffuser.
Figure 7:
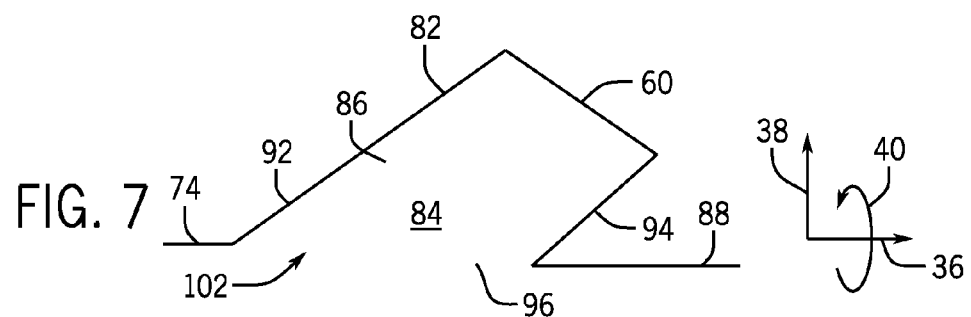
FIG. 7 is an embodiment of an integral diffuser.

In contrast, FIG. 5 shows an embodiment of the diffuser 60 having the outer side 92 and the inner side 94, which are generally parallel to each other, and which curve downstream as they approach the side wall 88. In other words, the angle of the outer side 92 and the angle of the inner side 94 gradually change (e.g., gradually transition from an upstream angle to a downstream angle) as they approach the support structure 74. Air 22 that flows through this diffuser 60 may have more radial 38 velocity than axial 36 velocity. FIG. 6 is an embodiment of the diffuser 60 having the mouth 96 that is flared, which may increase the spreading or diffusion of the air 22 as it leaves the diffuser 60. In this embodiment, the outer side 92 and the inner side 94 curve as they approach the support structure 74, and the outer side 92 and the inner side 94 are generally not parallel to (e.g., not aligned with) each other. Because the mouth 96 of the annular internal passage 86 is flared, air 22 exiting the diffuser 60 of FIG. 6 may diffuse across a wider axial 36 area as it enters the air cavity 84. In addition, the outer side 92 and the inner side 94 may be curved such that the air 22 is directed downstream (e.g., relative to the flow of fuel 20 in the mixing tubes 18), which may allow the diffuser 60 to be located closer to the apertures 90 in the mixing tubes 18. FIG. 7 is an embodiment of the diffuser 60 having the outer side 92 and the inner side 94 that are generally straight and parallel to each other. In other words, the outer side 92 and the inner side 94 approach the support structure 74 at generally constant and similar angles. This diffuser 60 may cause the air 22 flow to have a generally straighter path than the diffuser 60 having the curved annular internal passage 84.

As described above, the disclosed embodiments include the air diffuser 60, which may be disposed on the side wall 88 of the turbine combustor 14. Advantageously, the integral air diffuser 60 may impart a radially 38 inward redirection and otherwise condition the inlet air 22 flow to improve the quality of premixing in the plurality of mixing tubes 18. The presently described system may provide lower manufacturing costs, easier repair procedures, longer equipment lifetime, and/or lower emissions, for example.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a multi-tube fuel nozzle of a turbine combustor, comprising:
a support structure defining an interior volume configured to receive an air flow;
a plurality of mixing tubes disposed within the interior volume, wherein each mixing tube of the plurality of mixing tubes comprises a respective fuel injector positioned within an inlet end of the respective mixing tube and configured to inject a fuel into the respective mixing tube, and each mixing tube of the plurality of mixing tubes comprises at least one hole formed in a side wall of the respective mixing tube;
an outer annular wall having a first curved profile and extending radially outward from the support structure, wherein the outer annular wall is configured to direct the air flow from an annulus between a liner and a flow sleeve of the turbine combustor, at least partially radially inward into the interior volume through an air inlet disposed downstream of the respective fuel injector of each mixing tube of the plurality of mixing tubes relative to a flow direction of the fuel through each mixing tube of the plurality of mixing tubes, and at least partially axially upstream toward the respective fuel injector of each mixing tube of the plurality of mixing tubes and toward the at least one hole of each mixing tube of the plurality of mixing tubes, and the outer annular wall at least partially defines an air flow passage directing the air flow and extending from the annulus to the interior volume; and
an inner annular wall at least partially defining the air flow passage, wherein the inner annular wall has a second curved profile and extends radially outward from the support structure.

2. The system of claim 1, wherein the first curved profile extends from the flow sleeve to the support structure, and the inner annular wall is substantially parallel to the liner.

3. The system of claim 1, wherein the first curved profile has a first radius of curvature, and the second curved profile has a second radius of curvature.

4. The system of claim 3, wherein the first radius of curvature and the second radius of curvature are substantially equal.

5. The system of claim 3, wherein the first radius of curvature is greater than the second radius of curvature.

6. The system of claim 1, wherein the outer annular wall and the inner annular wall each approach the interior volume at a substantially constant angle.

7. The system of claim 1, wherein the at least one hole of each mixing tube of the plurality of mixing tubes comprises a plurality of holes configured to receive the air flow from the interior volume.

8. The system of claim 7, wherein the plurality of holes of each mixing tube of the plurality of mixing tubes is upstream of the air inlet relative to the flow direction of fuel through the plurality of mixing tubes.

9. The system of claim 1, wherein the inner annular wall curves radially outward from the support structure such that a portion of the inner annular wall is radially spaced apart from the support structure.

10. A system, comprising:
a multi-tube fuel nozzle assembly of a combustor, comprising:
a support structure defining an interior volume, wherein the interior volume is configured to receive an air flow through an air inlet;
an air diffuser comprising an outer annular wall and an inner annular wall, wherein the outer annular wall and the inner annular wall each has a curved profile and extends radially outward from the support structure, and the outer annular wall and the inner annular wall define an air passage extending to the air inlet of the interior volume;
a plurality of mixing tubes disposed within the interior volume, wherein each mixing tube of the plurality of mixing tubes comprises at least one hole formed in a side wall of the respective mixing tube and configured to receive the air flow from the interior volume; and
a plurality of fuel injectors, wherein each fuel injector of the plurality of fuel injectors is at least partially disposed within an inlet end of a respective one of the plurality of mixing tubes and is configured to inject a fuel flow into the respective one of the plurality of mixing tubes, and the plurality of fuel injectors are disposed upstream of the air inlet relative to a direction of the fuel flow through the plurality of mixing tubes.

11. The system of claim 10, wherein the air diffuser is configured to direct the air flow radially inward through the air inlet and axially upstream toward the plurality of fuel injectors and toward the at least one hole of each mixing tube of the plurality of mixing tubes.

12. The system of claim 10, wherein the air passage extends from an annulus between a liner and a flow sleeve of the combustor to the interior volume.

13. The system of claim 12, wherein a cross-section of the air passage increases in size from the annulus to the interior volume.

14. The system of claim 10, wherein the at least one hole of each mixing tube of the plurality of mixing tubes comprises a plurality of holes disposed upstream of the air diffuser relative to the direction of the fuel flow through the plurality of mixing tubes.

15. The system of claim 10, comprising the combustor or a gas turbine engine having the multi-tube fuel nozzle assembly.

16. The system of claim 10, wherein the inner annular wall curves radially outward from the support structure such that a portion of the inner annular wall is radially spaced apart from the support structure.

17. A method, comprising:
directing an air flow with an air diffuser of a turbine combustor from an axial flow direction to a radial flow direction and into an interior volume through an air inlet, wherein the interior volume comprises a plurality of mixing tubes, each mixing tube of the plurality of mixing tubes comprises a mixing chamber and at least one hole formed in a side wall of the respective mixing tube and configured to receive the air flow, and wherein the air diffuser comprises an outer annular wall and an inner annular wall, the outer annular wall and the inner annular wall each has a curved profile and extends radially outward from a support structure defining the interior volume;
injecting fuel from a plurality of fuel injectors into the plurality of mixing tubes, wherein each fuel injector of the plurality of fuel injectors is positioned within an inlet end of one of the plurality of mixing tubes and is positioned upstream of the air inlet relative to a flow direction of the fuel through the plurality of mixing tubes;
mixing the air flow and the fuel within the mixing chamber of each mixing tube of the plurality of mixing tubes to create a fuel-air mixture; and
outputting the fuel-air mixture from each mixing chamber into a combustion chamber of the turbine combustor.

18. The method of claim 17, wherein the at least one hole of each mixing tube of the plurality of mixing tubes comprises a plurality of holes formed in the side wall of the respective mixing tube and located upstream of the air diffuser relative to the flow direction of the fuel through the plurality of mixing tubes.

19. The method of claim 17, wherein the support structure surrounds the plurality of mixing tubes and the plurality of fuel injectors.

20. The method of claim 17, wherein the outer annular wall and the inner annular wall define an air passage extending from an annulus between a liner and a flow sleeve of the turbine combustor to the interior volume.

* * * * *